(12) United States Patent
Qureshi

(10) Patent No.: US 6,378,076 B1
(45) Date of Patent: Apr. 23, 2002

(54) SUBSTANTIALLY UNDETECTABLE DATA PROCESSING

(75) Inventor: Qadeer A. Qureshi, Round Rock, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/238,249

(22) Filed: Jan. 27, 1999

(51) Int. Cl.[7] .................................................. G06F 1/32
(52) U.S. Cl. ...................................... 713/322; 713/601
(58) Field of Search ............................ 713/300, 310, 713/320, 323, 322, 601

(56) References Cited

U.S. PATENT DOCUMENTS

| | | | | |
|---|---|---|---|---|
| 5,652,895 A | * | 7/1997 | Poisner | 713/322 |
| 5,754,869 A | * | 5/1998 | Holzhammer et al. | 713/300 |
| 5,954,819 A | * | 9/1999 | Kenny et al. | 713/322 |
| 6,092,208 A | * | 2/2000 | Reneris | 713/323 |
| 6,055,643 A | * | 4/2000 | Chaiken | 713/323 |
| 6,065,121 A | * | 5/2000 | Hobson et al. | 713/300 |
| 6,105,142 A | * | 8/2000 | Goff et al. | 713/324 |

* cited by examiner

Primary Examiner—Thomas M. Heckler
(74) Attorney, Agent, or Firm—Skjerven Morrill MacPherson LLP (57) ABSTRACT

A method and system for substantially undetectable data processing. The method and system provide data processing systems with an ability to detect a specific event, and enter a background activity state in response to the specific event detected. The specific event detected can be some type of background activity state initiation event, such as a wake event or a time-out event. The entry of a background state in response to the specific event detected can be the initiation of a background routine appropriate to the specific event, such as the initiation of a routine capable of controlling system temperature by passive means.

16 Claims, 6 Drawing Sheets

ADVANCED CONFIGURATION
AND POWER INTERFACE
STATES

FIG. 4

Full Implementation - Desktop

SUBSTANTIALLY UNDETECTABLE DATA PROCESSING

BACKGROUND OF THE INVENTION

1. Field of the Invention

The present invention relates, in general, to a method and system to be utilized in data processing systems.

2. Description of the Related Art

Data processing systems are systems that manipulate, process, and store data and are notorious within the art. Personal computer systems, and their associated subsystems, constitute well known species of data processing systems. Personal computer systems in general and IBM compatible personal computer systems in particular have attained widespread use for providing computer power to many segments of today's modem society. A personal computer system can usually be defined as a desk top, floor standing, or portable microcomputer that includes a system unit including but not limited to a system processor and associated volatile and non-volatile memory, a display device, a keyboard, one or more diskette drives, one or more fixed disk storage devices, and one or more data buses for communications between devices. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses.

A computer system or data-processing system typically includes a system bus. Attached to the system bus are various devices that may communicate locally with each other over the system bus. For example, a typical computer system includes a system bus to which a central processing unit (CPU) is attached and through which the CPU communicates directly with a system memory that is also attached to the system bus.

In addition, the computer system may include a peripheral bus for connecting certain highly integrated peripheral components to the CPU. One such peripheral bus is known as the Peripheral Component Interconnect (PCI) bus. Under the PCI bus standard, peripheral components can directly connect to a PCI bus without the need for glue logic. Thus, PCI is designed to provide a bus standard on which high-performance peripheral devices, such as graphics devices and hard disk drives, can be coupled to the CPU, thereby permitting these high-performance peripheral devices to avoid the general access latency and the band-width constraints that would have occurred if these peripheral devices were connected to a low speed peripheral bus. A few examples of peripheral devices that can communicate with the CPU are isochronous devices, network cards, and printer devices.

Each of the foregoing-referenced data processing system components consume power to perform their functions. As the number of components of a data processing system become more numerous, corresponding power requirements likewise increase.

Power consumption by data processing systems has become a concern in the data processing art. Electric power must be paid for, so power consumption translates to cost. Furthermore, when a device utilizes electric power, it also produces heat, which must be dissipated, and thus power consumption can translate to increased costs associated with environment maintenance. Additionally, in order to dissipate heat fans are often utilized, which result in unwanted and annoying fan noise and which draw power and produce heat. Furthermore, in portable data processing, or computing, systems (e.g., notebook, subnotebook, and palmtop computing devices) the power is typically supplied by batteries, and thus power consumption by the data processing systems becomes even more of a concern.

Previously, power management was primarily performed by the basic input/output system (BIOS) software. However, relatively recently a decision has been made within the industry to migrate to an Operating System Directed Power Management (OSPM) scheme. The primary vehicle by which this migration is being made is the Advanced Configuration and Power Management Interface (ACPI) specification, defined within the *Advanced Configuration and Power Interface Specification* (Intel, Microsoft, Toshiba Revision 1.0a Nov. 19, 1998), which is incorporated by reference herein in its entirety. OSPM and ACPI both apply to all classes of data processing systems, including desktop, portable, home, and server systems.

The ACPI specification is neither a hardware nor a software specification. Rather, the ACPI specification defines the capabilities and interface requirements of both software and hardware system components in order for those components to be deemed ACPI-compliant. The ACPI specification sets forth the software and hardware components relevant to ACPI and how they relate to each other. The ACPI specification defines the ACPI interfaces between the OS software, the hardware, and BIOS software.

The ACPI specification achieves power management via the use of "global system states", which apply to an entire data processing system, and are visible to the user. The various global system states are labeled G0 through G3 in the ACPI specification, and have various defined power-related attributes.

The ACPI specification gives rise to hope of an industry standard for efficient power management, and thus ACPI-compliant devices are desirable. As has been noted, power consumption is a current concern within the industry, and will likely remain so in the future. Thus, it is apparent that a need exists in the art for a method and system which are ACPI-compliant and provide improved operations of systems using the ACPI specification such as providing even more efficient power management and noise control than that available under the ACPI specification.

SUMMARY OF THE INVENTION

It has been discovered that an ACPI-compliant method and system can be produced which will, among other things, provide improved operation of systems utilizing the ACPI specification by allowing such systems to engage in substantially undetectable data processing. The method and system provide data processing systems with an ability to detect a specific event, and enter a background activity state in response to the specific event detected. The specific event detected can be some type of background activity state initiation event, such as a wake event or a time-out event. The entry of a background state in response to the specific event detected can be the initiation of a background routine appropriate to the specific event, such as the initiation of a routine capable of controlling system temperature by passive means.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following sets forth a detailed description of the best contemplated mode for carrying out the multiple independent inventions described herein. The description is intended to be illustrative and should not be taken to be limiting. In addition, the following detailed description has been divided into sections (e.g., sections I-II) in order to highlight the invention described herein; however, those skilled in the art will appreciate that such sections are merely for illustrative focus, and that the invention herein disclosed typically draws its support from multiple sections. Consequently, it is to be understood that the division of the detailed description into separate sections is merely done as an aid to understanding and is in no way intended to be limiting.

I. Environment

Figure 1:
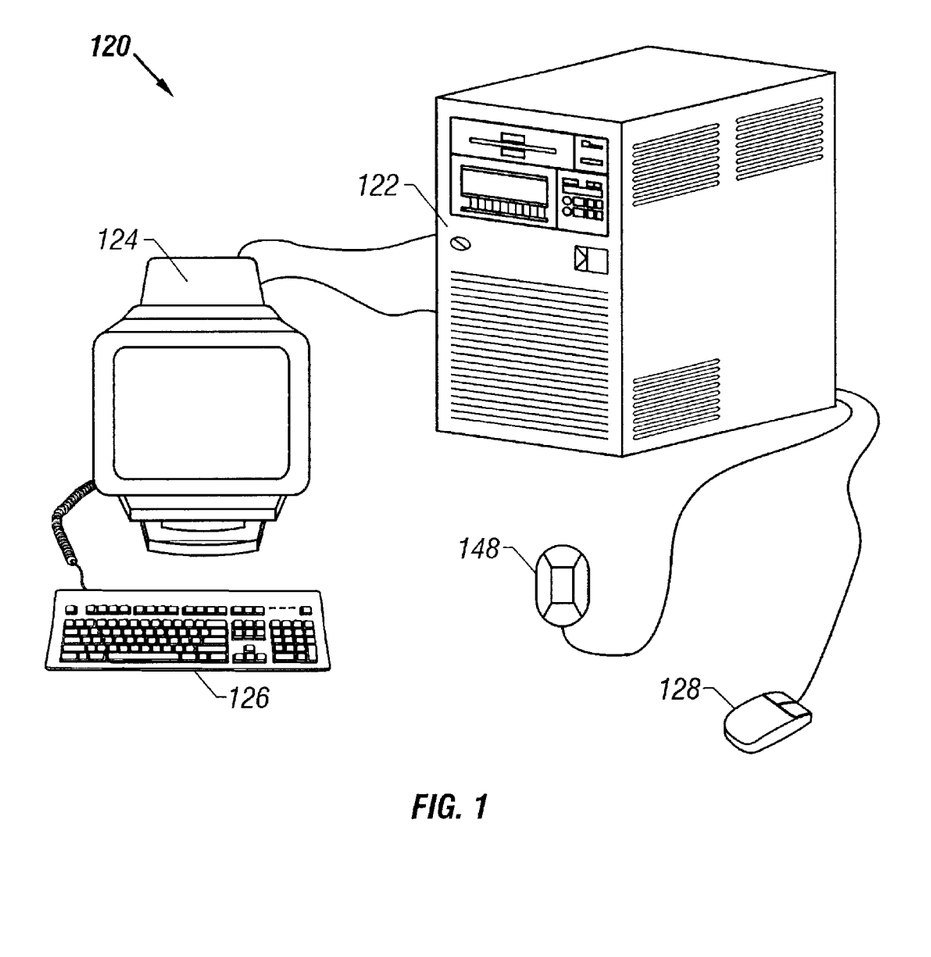
FIG. 1 depicts a pictorial representation of a data-processing system which can be utilized in accordance with the method and system of an illustrative embodiment of the present invention.

With reference now to the figures and in particular with reference now to FIG. 1, there is depicted a pictorial representation of a data-processing system which can be utilized in accordance with the method and system of an illustrative embodiment of the present invention. The graphical user interface system and method provided by an illustrative embodiment of the present invention can be implemented with the data-processing system depicted in FIG. 1. A data processing system 120 is depicted which includes a system unit 122, a video display terminal 124, a keyboard 126, a mouse 128, and a microphone 148. Data processing system 120 may be implemented utilizing any suitable computer such as an IBM-compatible or an Apple-compatible personal computer.

Figure 2:
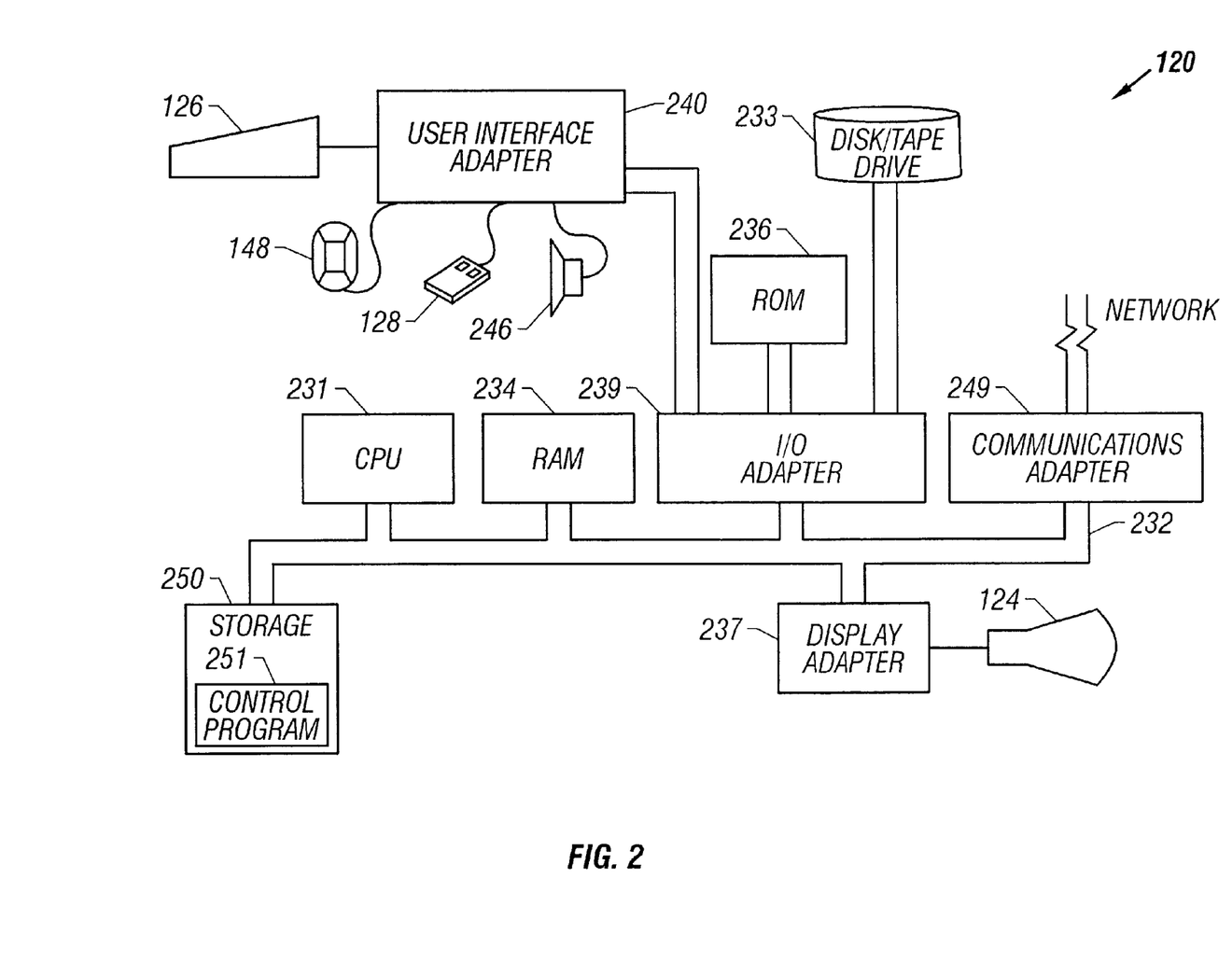
FIG. 2 illustrates a representative hardware environment, which incorporates a graphical user interface, which can be utilized in accordance with the method and system of an illustrative embodiment of the present invention.

FIG. 2 is an illustration of a representative hardware environment, which incorporates a graphical user interface, which can be utilized in accordance with the method and system of an illustrative embodiment of the present invention. FIG. 2 depicts selected components in data processing system 120 in which an illustrative embodiment of the present invention may be implemented. Data processing system 120 includes a Central Processing Unit ("CPU") 231, such as a conventional microprocessors and a number of other units interconnected via system bus 232. Such components and units of computer 120 can be implemented in a system unit such as unit 122 of FIG. 1. Computer 120 includes random-access memory ("RAM") 234, read-only memory ("ROM") 236, display adapter 237 for connecting system bus 232 to video display terminal 124, and I/O adapter 239 for connecting peripheral devices (e.g., disk and tape drives 233) to system bus 232. Video display terminal 124 is the visual output of computer 120, which can be a CRT-based video display well-known in the art of computer hardware. However, with a portable or notebook-based computer, video display terminal 124 can be replaced with an LCD-based or a gas plasma-based flat-panel display. Computer 120 further includes user interface adapter 240 for connecting keyboard 126, mouse 128, speaker 246, microphone 148, and/or other user interface devices, such as a touch screen device (not shown), to system bus 232 through I/O adapter 239. Communications adapter 249 connects computer 120 to a data-processing network.

Any suitable machine-readable media may retain the graphical user interface, such as RAM 234, ROM 236, a magnetic diskette, magnetic tape, or optical disk (the last three being located in disk and tape drives 233). Any suitable operating system and associated graphical user interface (e.g., Microsoft Windows) may direct CPU 231. Other technologies can also be utilized in conjunction with CPU 231, such as touch-screen technology or human voice control. In addition, computer 120 includes a control program 251 which resides within computer storage 250. Control program 251 contains instructions that when executed on CPU 231 carries out the operations depicted in the examples, state diagrams, and flowcharts described herein.

Those skilled in the art will appreciate that the hardware depicted in FIG. 2 may vary for specific applications. For example, other peripheral devices such as optical disk media, audio adapters, or programmable devices, such as PAL or EPROM programming devices well-known in the art of computer hardware, and the like may be utilized in addition to or in place of the hardware already depicted.

It is important that while an illustrative embodiment of the present invention has been, and will continue to be, described in the context of a fully functional computing system, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include: recordable type media such as floppy disks, hard disk drives, CD ROMs, and transmission type media such as digital and analogue communication links.

Those skilled in the art will recognize that data processing system 120 can be described in relation to data processing systems which perform essentially the same functionalities, irrespective of architectures. As an example of such, an alternative partial architecture data processing system 120 is set forth in FIG. 3.

Figure 3:
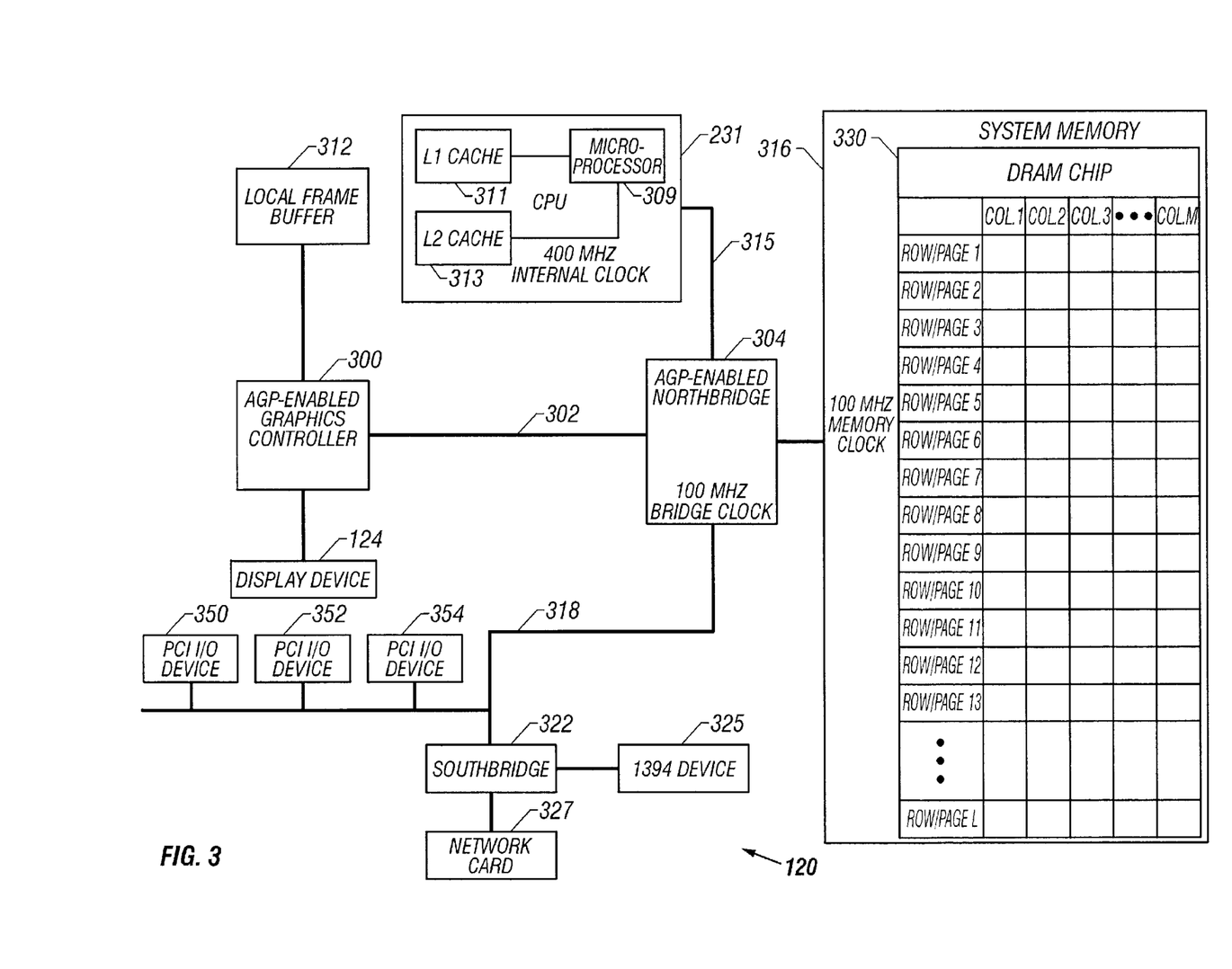
FIG. 3 shows a high-level component diagram depicting a data processing system which forms an environment wherein one or more embodiments of the present invention may be practiced

Referring now to FIG. 3, shown is a high-level component diagram depicting a partial data processing system 120 which forms an environment wherein one or more embodiments of the present invention may be practiced. Shown are AGP-enabled graphics controller 300, AGP interconnect 302 (a data bus), and AGP-enabled Northbridge 304. Not shown, but deemed present is an AGP-enabled operating system. The term AGP-enabled is intended to mean that the so-referenced components are engineered such that they interface and function under the standards defined within the AGP interface specification (Intel Corporation, *Accelerated Graphics Port Interface Specification*, Revision 1.0 Jul. 31, 1996)). Further depicted are video display device 124, local frame buffer 312, Central Processing Unit (CPU) 231 (wherein are depicted microprocessor 309, L1 Cache 311, and L2 Cache 313), CPU bus 315, system memory 316, Peripheral Component Interconnect (PCI) bus 318, various PCI Input-Output (I/O) devices 350, 352, and 354, Southbridge 322, 1394 Device 325, and network card 327.

The foregoing components and devices are used herein as examples for sake of conceptual clarity. As for (non-exclusive) examples, CPU 231 is utilized as an exemplar of any general processing unit, including but not limited to multiprocessor units; CPU bus 315 is utilized as an exemplar of any processing bus, including but not limited to multi-processor buses; PCI devices 350–352 attached to PCI bus 318 are utilized as an exemplar of any input-output devices attached to any I/O bus; AGP Interconnect 302 is utilized as an exemplar of any graphics bus; AGP-enabled graphics controller 300 is utilized as an exemplar of any graphics controller; Northbridge 304 and Southbridge 322 are utilized as exemplars of any type of bridge; 1394 device 325 is utilized as an exemplar of any type of isochronous source; and network card 327, even though the term "network" is used, is intended to serve as an exemplar of any type of synchronous or asynchronous input-output cards. Consequently, as used herein these specific exemplars are intended to be representative of their more general classes. Furthermore, in general, use of any specific exemplar herein is also intended to be representative of its class and the non-inclusion of such specific devices in the foregoing list should not be taken as indicating that limitation is desired.

Generally, each bus utilizes an independent set of protocols (or rules) to conduct data (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. This translation mechanism is normally contained in a hardware device in the form of a bus-to-bus bridge (or interface) through which the two different types of buses are connected. This is one of the functions of AGP-enabled Northbridge 304, Southbridge 322, and other bridges shown in that it is to be understood that such can translate and coordinate between various data buses and/or devices which communicate through the bridges.

Each component of data processing system 120 draws power. The ACPI specification provides a specification for power management of data processing systems such as data processing system 120. The ACPI specification is built upon a core concept of "states." In older systems there were only two states: on and off. Either the system was on or the system was off. When the system was powered on, everything was powered on (e.g., CPU 231, the hard disk, visual display device 124, speaker 246, microphone 128, etc., where all powered on or all powered off depending upon the toggling of a mechanical switch utilized to disconnect power from entire data processing system 120).

The ACPI specification has changed this scheme of power management, for a variety of reasons. Two reasons for this change are that CPUs are becoming faster and faster, and the number of transistors are becoming higher and higher. Each time a CPU clock causes transistors in a CPU to toggle from logical 0 to logical 1, the transistors draw a current surge. That is, when transistors are on (logical 1) or off (logical 0), the transistors draw virtually no power. It is in the transition state that the transistors draw the most current—that is, when the transistors are switching from logical 0 to logical 1 or from logical 1 to logical 0. Thus, when CPU clock frequency goes up, the number of times that the CPU transistors transition goes up, which means that the current drawn increases, and thus power consumed goes up. Thus, clock speed and the number of transistors contribute to current draw/power consumption. Modem CPUs now consume a tremendous amount of power (which is dissipated in the form of heat), and such consumption is likely to increase as CPU frequency/speeds and transistor density likewise increase.

Coterminous with its power management capabilities, the ACPI specification also provides thermal management capabilities. Modern processors are only guaranteed to function appropriately to a particular case temperature. Thus, it is imperative to remove the excess heat from the system. Otherwise the system will become overheated and may cease to function appropriately. Thus, one of the goals of system designers is to provide thermal management.

The ACPI specification provides at least two thermal management capabilities: "passive management" and "active management." Passive management is accomplished via "clock throttling." The CPU clock is turned on and off, to give a lower average effective clock speed. Since the CPU transistors mainly only draw power at transition, this decreases the amount of power consumed, which has a correspondent reduction in the amount of heat generated. Active management is via use of a temperature regulation device, such as a fan or a refrigeration device. Since this problem of thermal management is essentially coextensive with power management, it falls within the purview of the ACPI specification, which also defines ACPI thermal management mechanisms.

ACPI provides the foregoing, and other, capabilities by defining several other system states beyond the "on" and "off" states that were available in older systems. A few of these systems will now be discussed.

Figure 4:
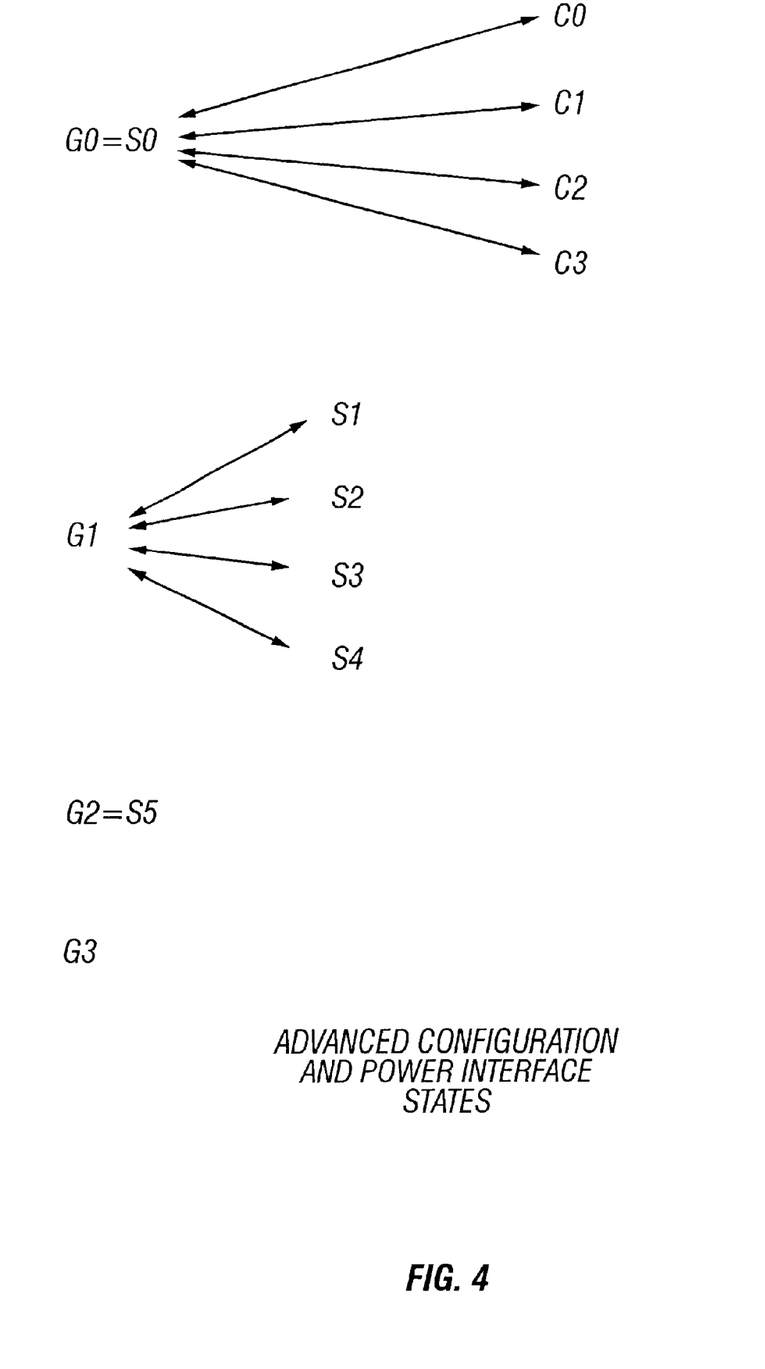
FIG. 4 depicts a pictographic representation of states defined by the ACPI specification

Referring now to FIG. 4, depicted is a pictographic representation of states defined by the ACPI specification which partially define an environment wherein an embodiment of the present invention may be practiced. The ACPI specification defines four overall "global" states, G0 through G3. As used in the ACPI specification, "global system states" apply to an entire data processing system. These states relate to how much power is being consumed in a system.

Essentially if a reduction of power consumed in a system is desired, there is only one truly effective thing to do: shut down devices that draw power. However, when devices are shut down, power draw is reduced, but so is functionality. The ACPI specification global system states represent defined tradeoffs between power consumption and functionality. These global states also represent an additional factor: restore latency. That is, when devices are turned off, power is saved, but longer latency time is required to restore the system to a more functional state. As a general rule, states that have more power saving also have longer restore latency. Further referring to FIG. 4, G0 is defined to be the global system state wherein the system is fully function—everything is potentially powered on; G0 is similar to the old "power on" in pre-ACPI systems. G1 is called the "sleep state," defined to be the global system state such that the system is not functional, but within a relatively short time the system can become fully functional in substantially exactly the same state as it was when the system went "to sleep." G2 is called the "soft off" which is defined to mean that the system actually is in an "off" state; this state is defined to be that such that when the system is powered on, it will go through its boot process. That is, soft off functions substantially like mechanical off, but a mechanical switch doesn't have be depressed by a user to turn the system off. The idea behind "soft off" is that the system will allow a user to direct the OS to turn the system off, and thereafter walk away, after which the OS will shut the system down once it completes its tasks (this represents an improvement over the older systems wherein a user either had to wait for the OS to complete its pending tasks before the system could be powered down, or the system powered down before all tasks were completed, resulting in various errors). G3 is called the "mechanical off state" and is defined to be the system state where a mechanical switch is actually toggled to power off; that is, the situation where there is no power applied to any part of the system, and it is safe to disassemble the system.

Now, notice that in FIG. 4, the sleep state, G1 has associated with it four sub-states S1, S2, S3, and S4. (Also shown is S0, which is essentially a notation utilized in the ACPI specification to coordinate the G0–G3 nomenclature states with the S1–S5 nomenclature states; as shown, G0 equates to S0, which just means that the system is not really sleeping.) S3 is known as suspend to RAM or "STR." S3 is defined to mean that when a system is placed in a sleep state, and the current state of the system is saved directly to RAM, allowing for very fast restart, or awaking, to G0 (or S0) state. S4 is substantially the same as S3, except that it is known as "suspend to disk" or "STD," which means that the system state is saved to disk, which allows for fast restart, but this restart is slower than S3, or STR, since reading from disk is slower than reading from RAM. Notice also that S4 draws less power than S3, since after disk store no power is required to preserve the data in that maintaining the data in RAM does require that some power be drawn. The ACPI specification defines an S5 state, again to coordinate the S1–S5 and G0–G3 nomenclature, in that S5 is defined to be substantially equivalent to G2, as is shown in FIG. 4.

With respect to the states S1 and S2, there is no clear definition in the ACPI specification as to what S1 and S2 actually mean, except that in general, as procession is made from S0 to S5, the power consumed decreases and the restore or recovery latency increases. Thus, these are residual and relative categories., Typically the way S2 is implemented is that power to the CPU is turned off, but power is still maintained to the other data processing system components. Typically the way Si is implemented is that everything in the system is still powered, but all the clocks are stopped (Recall from above that it was explained that the transistors in the CPU consume the most power during transitioning, so if the clocks are turned off, then a tremendous amount of power can be saved; also, the same is true for other transistors-based devices in the system) With the clocks stopped, the CPU can't do any useful work, but it can be put into a useful state very quickly by starting the clocks. That is, all the system information is still in the system but the system is just stopped in its execution when the clocks are stopped; thereafter, when the clocks are restarted, the system just picks up where it drops off.

Now, in addition to the foregoing described states, shown is that ACPI defines certain processor states C0, C1, C2, and C3. Now, when the processor is going through theses state transitions, as shown, its all happening when the system is in G0 (C0 through C3 are sub-states of G0. (Again, C0 is merely used to tie the states together, and it equates to the situation in which the system is in G0 state (fully on), and by definition every processor has C0.) ACPI does not define what C1, C2, and C3 are except that they follow the same general ACPI statement that as progression is made from C0 to C3, power consumption goes down, and recovery latency goes up. Typically, these states are implemented as follows: C1 is called autohalt, which means that the hardware doesn't really have to do anything. C1 arises from recognition that anytime software executes a halt instruction to CPU, the CPU will not execute any instruction after a halt (in the absence of this state, a CPU will just cycle doing useless work, in a "looping" fashion). Once software has executed a halt, and before an interrupt takes place to restart the CPU, CPU is not doing anything, the CPU internal clocks can softly be turned off. (it is not uncommon for there to be a nine-fold reduction in power consumption attained by shutting down the internal clocks).

The state C2 is called "stop-grant." Stop-grant is the result of a handshake operation between a CPU and system logic wherein system logic can direct that the CPU shut down its internal clocks (this is usually done because the operating system sees no activity that would indicate that the CPU would be needed any time in the near future). This actually is achieved by use of a signal called STPCLK# (stop clock signal). When the signal is asserted, the CPU can take some time before it actually stops. The reason for this is that the CPU may be doing a lot of things internally when the stop clock pin is asserted, and thus it is left up to the CPU to determine when best to stop in response to the assertion of the STPCLK# pin. So, when STPCLK# is asserted, that is simply a request for CPU to stop its internal clocks. CPU comes back some time later, and asserts a "stop grant" (C2) cycle.

The stop grant cycle tells the system that the CPU has actually stopped the clock. So this stop grant mechanism actually allows the system hardware to direct the CPU to stop its clocks. Typically this is achieved by an algorithm running somewhere which tries to figure out if a CPU is doing something, and when its not doing something, and no future activity is expected, the CPU is directed to stop the clock. Once stop grant mode is entered, STPCLK# pin must be kept asserted, because the way you come out of stop grant mode is that the STPCLK# pin signal is removed. When STPCLK# is removed then CPU starts its internal clocks and starts executing again.

State C3 is typically called sleep mode. The difference between C2 and C3, or "stop grant" and "sleep mode" is that when STPCLK# is asserted, it stops CPU, but the rest of the system is still working. For instance, a disk transfer may have been initiated, and during that transfer a memory controller may need to execute a cycle called a snoop cycle.

(A snoop cycle is a cycle wherein the onboard cache of a CPU is queried to determine if there is perhaps more recent data of interest than that existing in system memory. The result of the snoop cycle can be "the data is not in the cache," "the data is in the cache," or "the data is in the cache and is modified from that in system memory (which indicates that the copy in system memory is stale)." Thus, without running a snoop cycle it is not known whether the data in system memory is the most up to date. Thus, when the processor is in C2 state, snoop cycle capability must still exist.

C3 differs from C2 in that in C3 the system is allowed not to run snoop cycles. What this means is that snoop cycles can be run if desired, but the ability to run snoop cycles is not an absolute requirement as it is under the defined C2 state. However, most system implementations disable snoop cycles while in the defined C3 states.

II. Background and Foreground States

It has been discovered that a new system state, hereinafter referred to as the "background" state, can be created which will result in more user-friendly operation of data processing systems. This new state will be such that capability will be given to data processing systems to substantially silently and invisibly achieve all that which can be done without human interaction. That is, from a human user standpoint, the system will appear and sound as if it were off, even though in fact the system will be active and doing useful work. Furthermore, this new system state is to be such that if the system heats up, it is preferred that the fan not be turned on, in that the fan is typically quite noisy as compared to the operation of the CPU, associated memory (virtually silent), or modem (virtually silent without a speaker), or hard drive (again, virtually silent). Neither will audio or visual presentation devices be activated (although components internal to such devices may be activated, so long as they can be so activated silently and invisibly) The background activity state will be such that performance will be sacrificed for silent and invisible operation. That is, even when the temperature rises, the method of cooling will be passive.

Embodiments of the background state thus go against the teaching in the art. In the art, the teaching generally is such that optimum system performance is obtained in a power efficient manner. However, in embodiments of the background state, system efficiency is sacrificed such that tasks can be performed in a fashion substantially invisible and inaudible to a human user.

Figure 5:
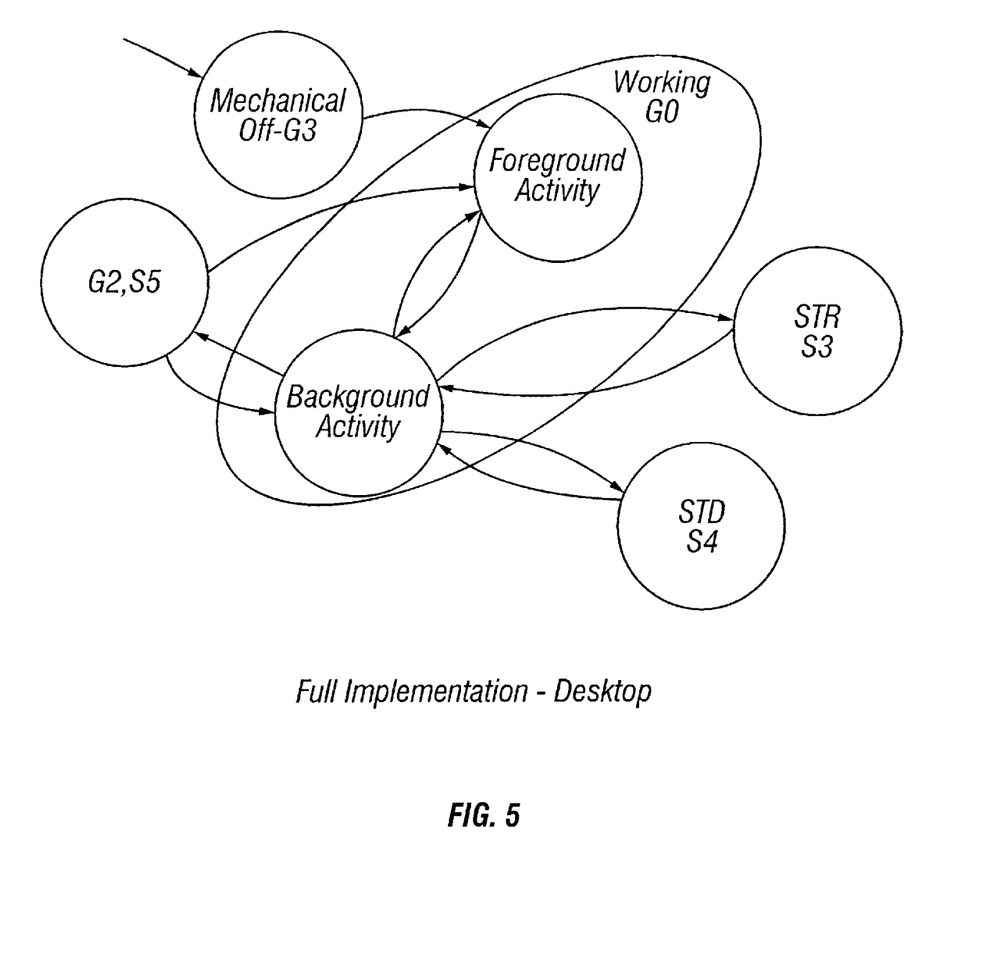
FIG. 5 illustrates a system state diagram depicting an embodiment of the present invention and how it relates to extant ACPI defined system states.

Referring now to FIG. 5, shown is a system state diagram depicting an embodiment of the present invention and how it relates to extant ACPI specification defined system states. Shown is working state G0. This is the normal working state of the system (G0 in the ACPI specification) in which user mode application code is executed and the system responds to external events with minimum latency. In this state, peripheral devices can change their power states dynamically based on the current usage. The parameters for system management of peripherals will typically be set at the factory, and user interaction will not be necessary to set/change such parameters. The user will have an option of changing system management parameters (like monitor, disk drive power down delay) using the standard Windows interface.

Shown is that in one embodiment of the present invention, contained within working state G0 are the two following sub-states: a foreground activity state and a background activity state. Depicted is that the foreground activity state is entered when the system detects an activity that indicates or requires some human user interaction. All the user interface devices (graphics, keyboard, mouse, voice, speakers) are active in this state, and are available to the system user. Thermal management can be both active and passive. Shown is that in various embodiments, the foreground activity state can be entered from G1 through G3 (S1 and S2 not shown, see FIG. 4 to coordinate S3, S4 with G1), as well as from the background activity state.

Further shown is that in one embodiment, the background activity state is a subset of the working state. As discussed, the background activity state is that used to perform background operations that do not require any external human user interaction. The background activity will typically be entered when the system is in some sleep state, and an event is detected that can be handled by the system without a need for human interaction. Shown is that in various embodiments, the background activity state can be entered from G1 through G2, as well as from the foreground activity state. That is, in one embodiment, a system may transition to the background activity state (for example, if the system determines user interaction has not taken place for some time (as indicated by a timeout), and an activity is taking place in the system that does not require user interaction (such as downloading files from an network)).

In one embodiment of the background activity state, the processor is in C0 state, while other peripherals may be in different power states. All the human interface devices (graphics subsystem, any other display devices, voice input, etc.) are in low power state, and there are not visible signs of system activity (with the exception of activity necessary to support the background tasks such as hard disk spinning). All system LEDs and other indicators (with the exception of hard drive LED and any other LED that may be used to indicate ACPI specification power states) are off. Thermal management is passive, and every attempt is made to keep the fan off (even if it means excessive clock throttling and lower performance). The fan should be turned on only when temperature is reaching a dangerous level which indicates system damage is likely, and passive cooling is no longer sufficient to prevent damage. If the fan has to be turned on, it should be turned off as quickly as possible.

In one embodiment, no additional system hardware features beyond that necessary for standard ACPI specification implementation are needed to support the background activity state. That is, in standard ACPI specification systems, one embodiment is such that the OS in conjunction with the BIOS can determine what devices are turned on and what devices stay off based on different detected events. It is assumed that individual system functions have the ability to be powered down under software control, which is a feature described under the ACPI specification, incorporated by reference, above.

Figure 6:
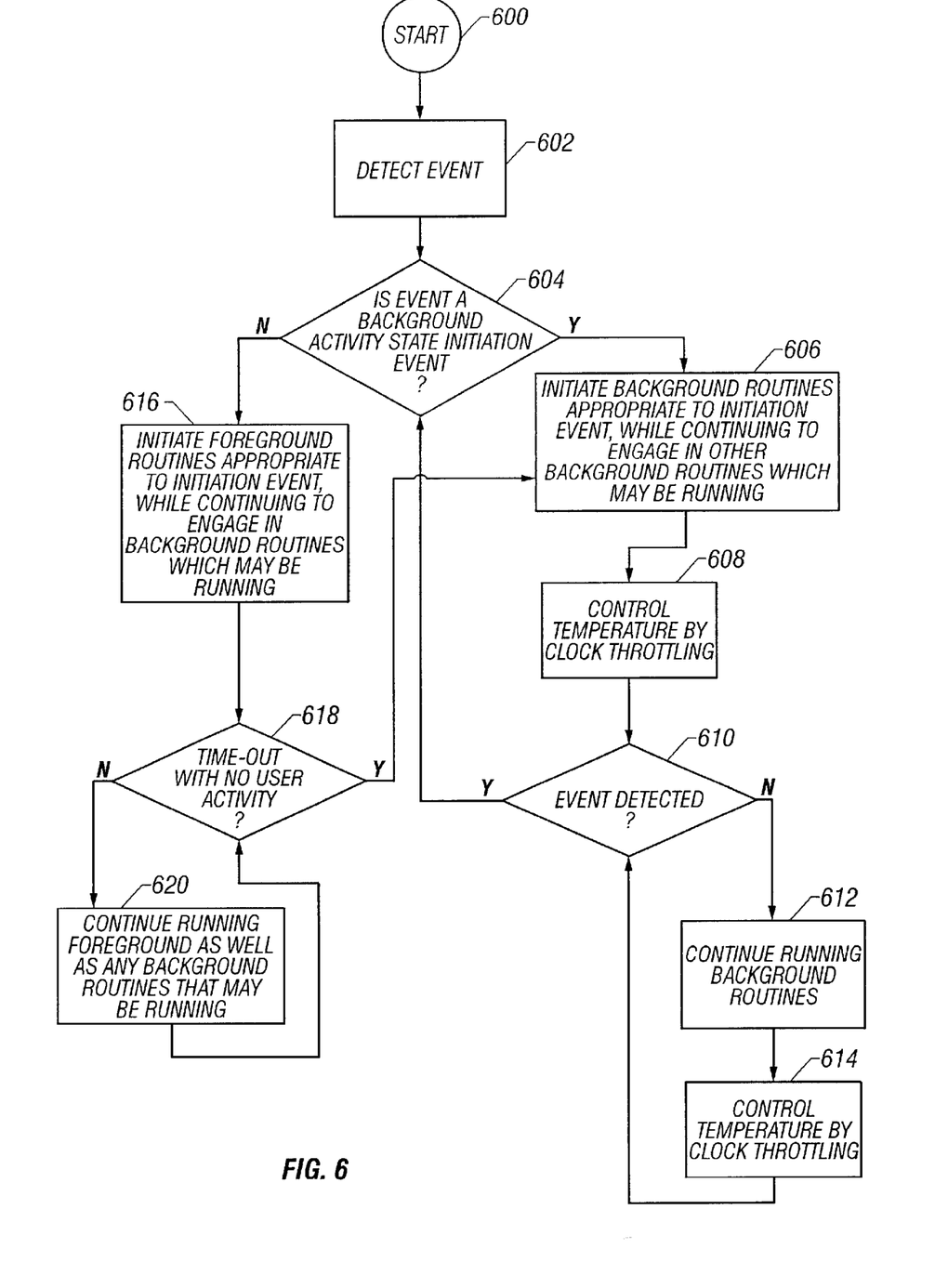
FIG. 6 shows a high-level logic flowchart depicting an embodiment of the present invention.

With reference now to FIG. 6, shown is a high-level logic flowchart depicting an embodiment of the present invention. Method step 600 depicts the start of the process. Method step 602 illustrates the detection of an event, which, as was shown and discussed in relation in FIG. 5, could for example be a wake event or the fact that a system in the foreground state had not had any significant human user interface activity during a period of time (e.g., the system timed out). Thereafter, shown in method step 604 is an inquiry as to whether the detected event of method step 602 is a background activity state initiation event. In the event that the detected event is a background activity state initiation event, method step 606 depicts the initiation of background routines appropriate to the initiation event; the background routines are engaged in substantially simultaneously with any other background routines which may already be running. The background routines are any routines which are of the type necessary to qualify as maintaining a data processing system in the background activity state. Method step 608 illustrates that while in the background activity state, temperature is controlled by clock throttling, or passive management.

Method step 610 shows that inquiry is made as to whether a new event has been detected. If no such event is detected, method step 612 depicts that the system continues running background routines. Thereafter, method step 614 demonstrates that cooling in the background activity state is achieved by passive means.

If the inquiry of method step 610 indicates that a new event is detected, the process proceeds to method step 604 and proceeds from that point.

If the inquiry of method step 604 indicates that the event detected is not a background activity state, the process proceeds to method step 616 wherein is illustrated the initiation of foreground routines appropriate to the detected initiation event; however, it should be noted that the foreground routines are executed substantially simultaneously with the continued engagement in any background routines which may already be running. Thereafter, method step 618 shows that a determination is made as to whether a time-out with no user activity has occurred, in which case the process proceeds to method step 606, enters the background state, and continues executing from that point. If no time-out occurs, method step 620 shows that the process continues executing in the foreground activity state.

The foregoing detailed description has set forth various embodiments of the present invention via the use of block diagrams, pictographic representations, flowcharts and examples. It will be understood as notorious by those within the art that each component, step, and operation illustrated by the use of block diagrams, pictographic representations, and examples can be implemented, individually and/or collectively, by a wide range of hardware, software, firmware, or any combination thereof. In one embodiment, the present invention is implemented via the use of operating system control in conjunction with the BIOS. However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this specification.

Other Embodiments

Several various embodiments have been described above, and it will be obvious to those skilled in the art that, based upon the teachings herein, changes and modifications may be made without departing from this invention and its broader aspects. That is, all examples set forth herein are intended to be exemplary and non-limiting.

For example, while the foregoing described embodiments have been described in the context of a single processor for the sake of clarity, it will be understood by those within the art that the present invention could be used in multiple processor environments. Accordingly, the described architectures are not intended to be limiting.

Also for example, while the embodiments have been described in the exemplary context of the AGP interface standard, it will be recognized that the embodiments herein can be applied to other similar problems which exist in other non-AGP interface standard systems wherein similar problems analogous to those solved by the present invention exist. For example, data processing systems wherein the AGP interface standard is not utilized, such as standard PCI and ISA systems. Thus, the specific protocols described are not intended to be limiting.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For example, as an aid to understanding, the following appended claims may contain usage of the phrases "at least one" or "one or more," or the indefinite articles "a" or "an," to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements.

What is claimed is:

1. A system comprising:
   means for detecting a specific event; and
   means for entering a background activity state in response to the specific event, wherein said means for entering the background activity state in response to the specific event comprises,
      means for initiating a background routine appropriate to the specific event, said means for initiating a background routine appropriate to the specific event comprises,
         means for controlling system temperature by passive means.

2. The system of claim 1, wherein said means for detecting a specific event further include:
   means for detecting a background activity state initiation event.

3. The system of claim 2, wherein said means for detecting a background activity state initiation event further includes:
   means for detecting a wake event.

4. The system of claim 2, wherein said means for detecting a background activity state initiation event further includes:
   means for detecting a time-out event.

5. The system of claim 1, wherein said system further comprises:
   an operating system;
   a processing unit, said processing unit executes said operating system;
   a first bridge coupled to said processor;
   a system memory coupled to said processor;

a graphics bus coupled to said processor; and an input-output bus coupled to said processor.

6. The system of claim 5, further comprising:

a graphics controller coupled to said processor;

a local frame buffer coupled to said graphic controller;

a display device coupled to said graphic controller; and an input-output bridge coupled to said graphic controller.

7. A method comprising:

detecting a specific event; and entering a background activity state in response to the specific event wherein said entering a background activity state in response to the specific event comprises initiating a background routine appropriate to the specific event, said initiating a background routine appropriate to the specific event comprises controlling system temperature by passive means.

8. The method of Claim 7, wherein said detecting a specific event further includes:

detecting a background activity state initiation event.

9. The method of claim 8, wherein said detecting a background activity state initiation event further includes:

detecting a wake event.

10. The method of claim 8, wherein said detecting a background activity state initiation event further includes:

detecting a time-out event.

11. A program product comprising:

means for detecting a specific event;

means for entering a background activity state in response to the specific event wherein said means for entering a background activity state in response to the specific event comprises, means for initiating a background routine appropriate to the specific event, said means for initiating a background routine appropriate to the specific event comprises, means for controlling system temperature by passive means; and signal bearing media bearing said means for detecting and entering.

12. The program product of claim 11, wherein said signal bearing media bearing said means for detecting and entering comprise recordable media.

13. The program product of claim 12, wherein said signal bearing media bearing said means for detecting and entering comprise transmission media.

14. The program product of claim 11, wherein said means for detecting a specific event further include:

means for detecting a background activity state initiation event.

15. The program product of claim 14, wherein said means for detecting a background activity state initiation event further includes:

means for detecting a wake event.

16. The program product of claim 14, wherein said means for detecting a background activity state initiation event further includes:

means for detecting a time-out event.

* * * * *